United States Patent
Iinuma et al.

(10) Patent No.: US 9,478,356 B2
(45) Date of Patent: Oct. 25, 2016

(54) COATED BARIUM TITANATE PARTICULATE AND PRODUCTION METHOD FOR SAME

(71) Applicant: KANTO DENKA KOGYO CO., LTD., Tokyo (JP)

(72) Inventors: Hidehiko Iinuma, Gunma (JP); Yoshimi Moriya, Gunma (JP)

(73) Assignee: KANTO DENKA KOGYO CO., LTD., Tokyo (JP)

( * ) Notice: Subject to any disclaimer, the term of this patent is extended or adjusted under 35 U.S.C. 154(b) by 0 days.

(21) Appl. No.: 14/441,888

(22) PCT Filed: Nov. 7, 2013

(86) PCT No.: PCT/JP2013/080078
§ 371 (c)(1),
(2) Date: May 11, 2015

(87) PCT Pub. No.: WO2014/077176
PCT Pub. Date: May 22, 2014

(65) Prior Publication Data
US 2015/0270067 A1  Sep. 24, 2015

(30) Foreign Application Priority Data
Nov. 13, 2012  (JP) ................. 2012-249324

(51) Int. Cl.
  *C04B 35/00*  (2006.01)
  *H01G 4/12*  (2006.01)
  (Continued)

(52) U.S. Cl.
  CPC .......... *H01G 4/1227* (2013.01); *C01G 23/006* (2013.01); *C04B 35/4682* (2013.01);
  (Continued)

(58) Field of Classification Search
  CPC ................ C04B 35/468; C04B 35/4682
  USPC ................................... 501/137–139
  See application file for complete search history.

(56) References Cited

U.S. PATENT DOCUMENTS 6,268,054 B1 * 7/2001 Costantino ........... C01G 23/006
                                                   428/403
6,447,910 B1  9/2002 Wataya
(Continued)

FOREIGN PATENT DOCUMENTS

JP  2000281341 A  10/2000
JP  2002265260 A   9/2002
(Continued)

OTHER PUBLICATIONS

Kazuhisa Hidaka et al., "Development and Industrialization of Fine Grain and High Crystalline Barium Titanate Synthesized by Hydrothermal Reaction", Ceramics, vol. 44, No. 9, pp. 718-719, (Sep. 1, 2009).

(Continued)

*Primary Examiner* — Noah Wiese
(74) *Attorney, Agent, or Firm* — Browdy and Neimark, P.L.L.C.

(57) ABSTRACT

Provided is a surface-coated barium titanate particulate for us in multilayer ceramic capacitors and for which the grain growth during high-temperature firing has been suppressed. Also provided is a production method for same. Barium titanate particulate obtained by means of a hydrothermal reaction, wherein the coated barium titanate particulate has an average particle diameter of at least 10 nm but less than 1000 nm, a Ba/Ti ratio of 0.80-1.20 inclusive, a c/a ratio of 1.001-1.010 inclusive, and a coating layer comprising at least one kind of metal compound selected from the group consisting of Mg, Ca, Ba, Mn and rare earth elements is included on the surface thereof. The coated barium titanate particulate according to the present invention is produced by means of a method including: (1) a step for obtaining barium titanate particulate by mixing an aqueous solution containing barium hydroxide and an aqueous solution containing titanium hydroxide at a Ba/Ti ratio of 0.80-1.20 inclusive, and subjecting same to a hydrothermal reaction at a temperature of 200-450° C. inclusive, a pressure of 2.0-50 MPa inclusive, and for a reaction time of 0.1 minutes-1 hour inclusive; (2) a step for uniformly dispersing the barium titanate particulate in an aqueous solution; and (3) a step for coating the metal compound on the surface of the barium titanate particulate.

3 Claims, 4 Drawing Sheets

(51) Int. Cl.
*C01G 23/00* (2006.01)
*C04B 35/468* (2006.01)

(52) U.S. Cl.
CPC ........ *C01P2002/77* (2013.01); *C01P 2004/04* (2013.01); *C01P 2004/62* (2013.01); *C01P 2004/64* (2013.01); *C01P 2004/84* (2013.01); *C01P 2006/12* (2013.01)

(56) References Cited

U.S. PATENT DOCUMENTS

| | | | |
|---|---|---|---|
| 6,733,740 | B1 | 5/2004 | Costantino et al. |
| 7,652,870 | B2 * | 1/2010 | Yamazaki ............ C04B 35/4682 361/311 |
| 7,854,916 | B2 * | 12/2010 | Park .................... C01G 23/006 423/594.16 |
| 8,208,240 | B2 * | 6/2012 | Yamazaki ............ H01G 4/1227 361/321.4 |
| 2002/0091059 | A1 | 7/2002 | Venigalla |

FOREIGN PATENT DOCUMENTS

| | | |
|---|---|---|
| JP | 2003137649 A | 5/2003 |
| JP | 2004067504 A | 3/2004 |
| JP | 2004123431 A | 4/2004 |
| JP | 2004517795 A | 6/2004 |
| JP | 200627971 A | 7/2004 |
| JP | 2004524249 A | 8/2004 |
| JP | 2006298746 A | 11/2006 |
| JP | 2007204315 A | 8/2007 |
| JP | 2010030861 A | 2/2010 |
| JP | 2010168253 A | 8/2010 |
| JP | 2011178643 A | 9/2011 |

OTHER PUBLICATIONS

Takashi Hayashi et al., "Preparation and Properties of $ZrO_2$-Coated $BaTiO_3$ Composite Particles by Sol-Gel Method with Zr-Alkoxide", Journal of the Society of Materials Science, vol. 50, No. 6, pp. 630-633, Jun. 15, 2001.

International Search Report PCT/JP2013/080078 dated Apr. 22, 2014.

Notification of Transmittal and translation of the international preliminary report on patentability in corresponding appl No. JP2013080078, dated Nov. 7, 2013.

* cited by examiner before firing    after firing before firing    after firing before firing    after firing before firing    after firing before firing    after firing before firing    after firing before firing　　　　after firing

COATED BARIUM TITANATE PARTICULATE AND PRODUCTION METHOD FOR SAME

TECHNICAL FIELD

The present invention relates to barium titanate particles comprising a coating layer of metal compounds (referred to hereinafter as coated barium titanate particles) and a production method thereof. The coated barium titanate particles of the present invention are preferable for use as a dielectric material of a multi-layer ceramic capacitor (MLCC) or as an additive for the Ni inner electrode.

BACKGROUND ART

As a result of the recent downsizing and sophistication of electronic devices, there is a demand to downsize multi-layer ceramic capacitors (MLCC) and to enhance its capacity. The downsizing and capacity-enhancement of MLCC requires the dielectric layer to be thinned, and the current thinning technology is able to provide a thickness of 1 μm or lower.

There is a want for barium titanate particles used in the dielectric material to be particles with a uniform particle shape, narrow particle size distribution, high crystallinity, and good dispersibility. However, barium titanate decreases in crystallinity as the particle size becomes minute (lower than 200 nm), the problem known as the size effect.

A known indicator of the crystallinity of barium titanate is the c/a ratio (rate of the c-axis and the a-axis of a unit crystal), and a particle size of below 200 nm provides a c/a ratio of below 1.009, also leading to a decrease in the dielectric constant. To support downsizing and capacity enhancement of MLCC, the barium titanate must concurrently achieve minute size, high crystallinity, and high dispersibility.

Barium titanate particles have been conventionally synthesized by various methods, such as solid phase reaction, oxalic acid salt method, sol-gel method, and hydrothermal reaction.

The solid phase reaction uses titanium oxide as the titanium source, and barium carbonate as the barium source. The raw material is in the form of fine particles, which are mixed uniformly and thermally treated at a temperature of about 1000° C. to synthesize barium titanate particles. After synthesis, the particles must be minutely processed using a grinder, and the particles are submicronic, tending to be un-uniform and poor in dispersibility.

The oxalic acid salt method (e.g. Patent Document 1) is a method of adding an oxalic acid solution to an aqueous solution of titanium salt and barium salt to precipitate out barium titanyl oxalate, and thermally treating the obtained barium titanyl oxalate at 700° C. or higher to synthesize barium titanate. It is a type of solid phase reaction, but it allows precursors to be mixed at the atom level, and produces particles that are finer and have a more uniform composition than the solid phase reaction. However, similar to the solid phase reaction, it tends to provide a particle shape that is submicronic and un-uniform.

The sol-gel method is a method of subjecting an alcohol solution obtained by mixing an alkoxide of titanium and an alkoxide of barium to a reflux operation to obtain a complex alkoxide, and subjecting the result to a hydrolysis reaction to obtain a precursor of barium titanate.

The precursor particle has a particle size of a dozen nano or higher and 100 nm or lower, but it has a low crystallinity, so it needs to be thermally treated at a high temperature. The particle growth, aggregation, sintering resulting from the thermal treatment are regulated to obtain the target particle size. This method allows particles that are fine and have high crystallinity to be obtained; however, the uniformity of the particle shape and dispersibility are low.

The hydrothermal reaction is a reaction using liquid phase reaction, and it is normally carried out by reacting titanium hydroxide, which has been obtained by hydrolysis of a titanium compound, and barium hydroxide under a high temperature/high pressure condition of 100° C. or higher to synthesize barium titanate. The particle size obtained by the hydrothermal reaction is affected by the titanium material, so the particle size of the synthesized barium titanate decreases as the particle size of titanium oxide obtained by hydrolysis decreases. The hydrothermal reaction can readily provide particles with a fine particle size that are difficult to synthesize by the solid phase reaction or the oxalic acid salt method, and it is more capable of providing particulates having high crystallinity and high dispersibility without performing thermal reaction, compared to the sol-gel method.

Patent Documents 2 and 3 teach barium titanate particles that concurrently achieve a minute size, high crystallinity, and high dispersibility, or production methods thereof. In a conventional hydrothermal reaction, the reaction generally occurred at a low temperature (lower than 200° C.), low pressure (lower than 2 MPa), and a long duration (few hours), and the particle size could be controlled to 10 to 200 nm by controlling the reaction time, but such reaction provided low crystallinity (c/a ratio, crystallite size) compared to the solid phase reaction. In contrast, Patent Document 2 or 3 describes synthesizing particulates that have minute sizes, and are concurrently single crystals, have high c/a ratios and dielectric constants, and require no thermal treatment, by setting the hydrothermal reaction conditions to a high temperature (200° C. or higher), a high pressure (2 MPa or higher), and a short duration (shorter than 1 hour). Since no thermal treatment is required, the particles are able to achieve a uniform particle shape and good dispersibility.

In the preparation process of Ni-MLCC that uses Ni in the inner electrode, Ni-MLCC is prepared by adding a binder to the barium titanate and additives, etc. and mixing/dispersing the result, followed by the steps of sheet shaping, electrode formation, lamination, contact bonding, cutting, debinding, firing, terminal shaping, baking, plating, etc. Since Ni is used for the inner electrode, the sintering step is performed by sintering at a high temperature of 1000° C. or higher in a hydrogen atmosphere.

Conventionally, attempts were made to regulate reduction of barium titanate (i.e. generation of oxygen defect) at firing by setting the molar rate of the A site and the B site of the perovskite to higher than 1, substituting some Ba atoms with Ca, or adding Mn compounds to prevent reduction of barium titanate in the firing step. In addition, means to achieve a long life of Ni-MLCC are under consideration including adding Mg compounds or rare earth compounds to barium titanate, performing thermal treatment after firing to re-oxidate the dielectric, lowering the oxygen partial pressure at firing, or setting a molar rate of the A site and the B site of the perovskite at the grain boundary to higher than 1.

There are also attempts to improve the performance of Ni-MLCC by modifying the dielectric layer through mixing various compounds, such as Ba, Ca, Mn, Mg, and rare earth elements, with barium titanate particles.

When barium titanate particles taught in Patent Document 2 or 3, specifically particles produced by hydrothermal reaction under a high temperature/high pressure condition, and concurrently achieving minute size, high crystallinity, and high dispersibility, are used as the dielectric material of Ni-MLCC, the raw material will be mixed/dispersed well, and a good sheet smoothness will be obtained in the sheet shaping step. However, firing at a high temperature leads to a short MLCC life due to the grain growth of barium titanate, compared to when barium titanate synthesized by solid phase reaction, etc. is used. This is because barium titanate particles prepared by solid phase reaction, etc., which have high crystallinity due to thermal treatment at a high temperature, do not exhibit grain growth even if they are subjected to firing at a high temperature again, but barium titanate synthesized by hydrothermal reaction shows high particle surface activity, which promotes sintering between particles, easily leading to grain growth.

Consequently, if barium titanate particles obtained by a hydrothermal reaction at a high temperature/high pressure condition, concurrently achieving minute size, high crystallinity, and high dispersibility are to be used as the dielectric material of MLCC, it is necessary to regulate grain growth of barium titanate particles in the firing step of the Ni-MLCC preparation process.

CITATION LIST

Patent Documents

Patent Document 1: Japanese Patent Publication No. 2004-123431 A
Patent Document 2: Japanese Patent Publication No. 2010-30861 A
Patent Document 3: Japanese Patent Publication No. 2010-168253 A

SUMMARY OF INVENTION

Technical Problem

The present invention was performed in view of the above situation, and its object is to provide a barium titanate particle that is suitable for use as a dielectric material of MLCC, that is obtained by hydrothermal reaction under a high temperature/high pressure condition, and that has a surface coated with a metal compound(s), and a production method thereof.

Solution to Problem

The present inventors performed extensive studies to solve the above problems and found that the grain growth of barium titanate particles in the firing step can be regulated when the particle surface of barium titanate particles obtained by a hydrothermal reaction under a high temperature/high pressure condition is uniformly coated with compounds, such as Mg, Mn, Ca, Ba, rare earth elements, and thus completed the present invention.

In other words, the present invention provides the following embodiments.

[1] A coated barium titanate particle characterized in that a coating layer comprising a compound of at least one type of metal selected from a group consisting of Mg, Ca, Ba, Mn and rare earth elements is placed on a surface of a barium titanate particle obtained by a hydrothermal reaction at a temperature of 200° C. or higher and 450° C. or lower, a pressure of 2 MPa or higher and 50 MPa or lower, and a reaction time of 0.1 minute or longer and 1 hour or shorter, wherein the particle has a mean particle size of 10 nm or higher and lower than 1000 nm, a Ba/Ti ratio of 0.80 or higher and 1.20 or lower, and a c/a ratio, which is a rate of a c-axis and an a-axis of 1.001 or higher and 1.010 or lower.

[2] The coated barium titanate particle according to [1], wherein the coating layer consists of a compound of at least one type of metal selected from a group consisting of Mg, Ca, Ba, Mn and rare earth elements.

[3] The coated barium titanate particle according to [2], wherein the coating layer consists of an oxide, a hydroxide, and/or a carbonate of at least one type of metal selected from a group consisting of Mg, Ca, Ba, Mn and rare earth elements.

[4] The coated barium titanate particle according to either [2] or [3], wherein the rare earth elements are at least one element selected from a group consisting of Sc, Y, La, Ce, Pr, Nd, Pm, Sm, Eu, Gd, Tb, Dy, Ho, Er, Tm, Yb, and Lu.

[5] The coated barium titanate particle according to [1], wherein the coating layer is 0.01 mass % or higher and 20.0 mass % or lower on a basis of a total mass of a coated barium titanate particle and a coating layer.

[6] A method for producing the coated barium titanate particle according to [1] comprising the steps of:
(1) mixing an aqueous solution containing barium hydroxide and an aqueous solution containing titanium hydroxide at a barium/titanium ratio of 0.80 or higher and 1.20 or lower, and subjecting a resulting mixture to a hydrothermal reaction at a temperature of 200° C. or higher and 450° C. or lower, a pressure of 2.0 MPa or higher and 50 MPa or lower, and a reaction time of 0.1 minute or longer and 1 hour or shorter to obtain barium titanate particles;
(2) homogenously dispersing the barium titanate particles in an aqueous solution; and
(3) depositing metal compounds on surfaces of the barium titanate particles.

[7] A method for producing coated barium titanate particles by thermally treating the coated barium titanate particles produced by the method of [6] at 500 to 1000° C.

Advantageous Effects of Invention

The coated barium titanate particles of the present invention is advantageous in that their grain growth in a firing step is restricted relative to conventional barium titanate particles obtained by hydrothermal reaction under a high temperature/high pressure condition, so they are preferable for usages, such as the dielectric material of multi-layer ceramic capacitors, and additives for Ni internal electrodes. In addition, the production method of the above particles of the present invention enables a relatively reduced production cost, so it is useful for industrialized mass production.

DESCRIPTION OF EMBODIMENTS

Figure 1:
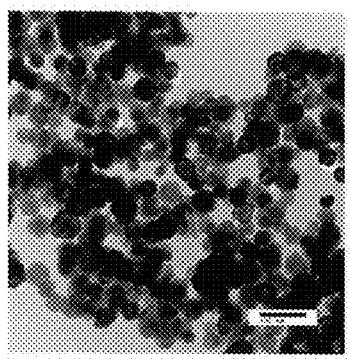
FIG. 1 is a transmission electron microscope image (magnification of 200,000×) showing the particle form of barium titanate particles of 50 nm prepared by the method of the present invention.

The coated barium titanate particles of the present invention and the production method thereof are explained below by preferable embodiments, but the present invention is not limited by the explanation.

The present inventors found that the grain growth of barium titanate particles can be regulated in the firing step in the Ni-MLCC forming process by uniformly depositing metal compounds, such as Mg, Mn, Ca, Ba, rare earth elements, that are added to enhance the Ni-MLCC property, onto the particle surface of barium titanate particles obtained by hydrothermal reaction under a high temperature/high pressure condition.

The reason has not been clearly understood, but it can be thought as follows. Barium titanate particles that are synthesized by hydrothermal reaction under a high temperature/high pressure condition exhibit better dispersibility than those of conventional solid phase reaction or hydrothermal reaction at a low temperature/low pressure condition, so it is easier for metal compounds to be deposited uniformly on their surface, and when fired at a high temperature, reaction on the particle surface of barium titanate particles with metal compounds proceeds uniformly. As a result, for Mg, Mn, Ba, Ca, the metals become a homogenous solid solution in barium titanate and regulate grain growth, and for rare earth elements, substances effective for regulating grain growth, namely, $Ba_2TiO_4$, rare earth oxides, or complex oxides of rare earth elements and titanium oxide are uniformly formed on the particle surface.

In addition, in the conventional Ni-MLCC production process, metal compounds and binders were added to barium titanate and uniformly mixed using a wet-type dispersing machine, such as a beads mill. However, it was difficult to uniformly disperse the metal compounds on the particle surface of the barium titanate particles, and an uneven dispersion led to reduction of the MLCC property. On the other hand, the present invention allows metal compounds to be uniformly deposited on the particle surface of the barium titanate particles, and thus, enables not just grain growth regulation, but also formation of a uniform core shell structure, so the present invention is effective in enhancing the MLCC properties.

The atom rate of barium and titanium (Ba/Ti ratio) in the coated barium titanate particles of the present invention is 0.80 to 1.20, preferably 0.90 to 1.10, and more preferably 0.95 to 1.05. When the Ba/Ti ratio is smaller than 0.80, impurities exist in the particles, the c/a ratio decreases, the particle form becomes un-uniform, and the dielectric property decreases. Further, when the Ba/Ti ratio is larger than 1.20, impurities such as Ba compounds exist in the particles, and the dielectric property decreases.

The coated barium titanate particles of the present invention have a mean particle size of 10 to 1000 nm, preferably 10 to 500 nm, and more preferably 10 to 200 nm. The mean particle size of the barium titanate particles is obtained based on observation by a transmission electron microscope (TEM) measuring the particle size of any 200 or more particles in the TEM image of a magnification of 30,000× to 200,000× and obtaining a mean amount. The minimum size for obtaining a uniform particle form and a high dispersibility is 10 nm. When the reaction temperature is set high, and much alkali is added to accelerate crystal growth, the mean particle size exceeds 1000 nm and the particles become un-uniform.

The coated barium titanate particles of the present invention has a relative standard deviation of the particle size distribution of 25.0% or lower, and preferably 20.0% or lower. A narrow particle size distribution provides a good sheet smoothness in the sheet forming step in the MLCC production process.

The coated barium titanate particles of the present invention should preferably have a c/a ratio of tetragonal $BaTiO_3$ of 1.001 or higher, more preferably 1.003 to 1.010, and even more preferably 1.005 to 1.010. A c/a ratio of the tetragonal $BaTiO_3$ that is lower than 1.001 is not preferable, since it leads to a decrease in the dielectric constant. The tetragonal $BaTiO_3$ was subjected to an X-ray diffraction analysis, and the c/a ratio of the tetragonal $BaTiO_3$ was obtained by the Rietveld Analysis.

The metal compound of the coated barium titanate particles of the present invention includes oxides, hydroxides, and/or carbonates (including hydrates of carbonates) of Mg, Ca, Ba, Mn, or rare earth elements. The rare earth elements include Sc, Y, La, Ce, Pr, Nd, Pm, Sm, Eu, Gd, Tb, Dy, Ho, Er, Tm, Yb, and Lu. The amount of metal compounds covering the particle based on the total mass of coated barium titanate particles should preferably be 0.01 to 20.0 mass %, and more preferably 0.1 to 15.0 mass %. When the amount covering the metal compound is less than 0.01 mass %, the grain growth regulating effect is small. When the amount covering the metal compound is greater than 20.0 mass %, the grain growth regulating effect exists, but the dielectric property decreases.

Next, a preferable production method of the coated barium titanate particles of the present invention is explained.

The coated barium titanate particles of the present invention may be produced by i) step of synthesizing barium titanate particles, and ii) step of coating the barium titanate particles with metal compounds, shown below.

<i) Step of Synthesizing Barium Titanate Particles>

To begin with, an aqueous solution containing barium and titanium hydroxide is prepared. The preparation methods include methods (A) and (B), shown below.

(A) Firstly, a titanium salt solution is prepared, to which an alkali solution is added, then a neutralization reaction is performed to generate titanium hydroxide to obtain an aqueous solution containing titanium hydroxide. Then, a barium salt solution is added to the aqueous solution containing titanium hydroxide to obtain an aqueous solution containing barium and titanium hydroxide.

(B) Firstly, a titanium salt solution is prepared, and the titanium salt solution is added to the alkali solution, then a neutralization reaction is performed to generate titanium hydroxide to obtain an aqueous solution containing titanium hydroxide. Then, a barium salt solution is added to the aqueous solution containing titanium hydroxide to obtain an aqueous solution containing barium and titanium hydroxide.

In the methods of (A) and (B), the barium salt solution may be added in advance to the titanium salt solution or the alkali solution before the neutralization reaction. The dissolution or addition of the barium salt should preferably be performed in an inactive atmosphere, preferably a nitrogen atmosphere, to prevent carbonic acid, etc. in the air from reacting.

In the methods of (A) and (B), barium and titanium hydroxide generated by the neutralization reaction can be heated at a temperature range of 200° C. or lower to generate barium titanate in advance.

Or else, in the methods of (A) and (B), an organic compound can be added to an aqueous solution containing barium and titanium hydroxide after the neutralization reaction, or an organic compound can be added to a barium salt solution, titanium salt solution or an alkali solution before the neutralization reaction. The organic compound to be used is not limited as long as the desired physical property is satisfied, and it can be a polymer, such as a surfactant, etc. The amount of organic compound to be added should preferably be 0.01 mass % or higher, more preferably 0.01 to 15.0 mass %, and even more preferably 0.1 to 10.0 mass %, with regard to the theoretical generation amount of barium titanate.

The titanium salt solution to be used in the methods of (A) and (B) includes, for example, an aqueous solution of various titanium salts, such as sulfate, nitrate, chloride, or alkoxide. Also, a single titanium salt solution may be used, or a mixture of a plurality of titanium salt solutions may be used. The concentration of a titanium salt solution is preferably 0.05 to 5.5 mol/L, more preferably 0.13 to 3.0 mol/L. In addition, an aqueous solution containing titanium oxide can be used instead of a titanium salt solution.

The barium salt solution to be used in the methods of (A) and (B) includes, for example, an aqueous solution of various barium salts, such as sulfate, nitrate, chloride, carbonate, or alkoxide. Also, a single barium salt solution may be used, or a mixture of a plurality of barium salt solutions may be used. The concentration of a barium salt solution is preferably 0.05 to 2.0 mol/L, more preferably 0.1 to 1.5 mol/L.

The above mentioned titanium salt solution and barium salt solution should be added so that the Ba/Ti ratio of the solution containing barium and titanium hydroxides is 0.8 to 1.20, preferably 0.90 to 1.10, more preferably 0.95 to 1.05.

The alkali solution to be used in the methods of (A) and (B) includes, for example, an aqueous solution of NaOH, KOH, $NH_3$, $Na_2CO_3$, $K_2CO_3$, $NaHCO_3$, $KHCO_3$, or $(NH_4)_2CO_3$. The concentration of the alkali solution should preferably be 0.1 to 20.0 mol/L, more preferably 1.0 to 10.0 mol/L, and the amount of alkali should be such that the degree of neutralization of the barium titanate particles is 0.8 or higher. When the degree of neutralization is lower than 0.8, barium titanate becomes a plate like particle of 100 nm or lower, and the Ba/Ti ratio becomes an amount lower than 0.80, and an impurity phase of a titanium-rich barium titanium compound other than a $BaTiO_3$ phase is formed in the crystal structure.

Further, in the aqueous solution containing barium and titanium hydroxide, compounds, such as Mg, Ca, Sr, Pb, etc., may be added to replace the Ba site of the perovskite crystal structure with at least one element selected from Mg, Ca, Sr, Pb, etc., and compounds, such as Zr, Hf, Sn, may be added to replace the Ti site, in order to control the dielectric constant, Curie temperature, the temperature constant of a dielectric constant, as a dielectric material. These compounds may be added at any stage of preparing the aqueous solution containing barium and titanium hydroxides, and it can be added after the aqueous solution containing barium and titanium hydroxides is prepared.

Next, the aqueous solution containing barium and titanium hydroxides is subjected to hydrothermal reaction under a high temperature/high pressure condition. The hydrothermal reaction is performed at a temperature of 200° C. or higher, preferably 200 to 450° C., more preferably 250 to 400° C., and a total pressure of 2 MPa or higher, preferably 2 to 50 MPa, more preferably 10 to 40 MPa, and for the duration of normally 0.1 minute or longer, preferably 0.1 minute to 1 hour, more preferably 0.1 to 30 minutes. Hydrothermal reaction is thus performed at such high temperature/high pressure condition to control the particle form, such as the particle size, and the particle uniformity, and after filtration and washing by water, a drying process and a disintegration process are performed to obtain barium titanate particles. In particular, the control of the reaction time allows control of the particle size.

The above hydrothermal reaction condition can be determined appropriately within the above range by the type of material, Ba/Ti ratio, alkali amount, reaction scale, reaction temperature, reaction pressure and reaction time, etc. for the aqueous solution containing barium and titanium hydroxide. The minimum temperature for forming barium titanate particles by the above hydrothermal reaction is 60° C., but a temperature of 200° C. or higher is preferable to obtain particles with high crystallinity and dispersibility. The maximum temperature for the hydrothermal reaction is not particularly limited, and it may exceed the critical point, but the specification of the reactor sets the limit.

<ii) Step of Coating the Barium Titanate Particles with Metal Compounds>

The barium titanate particles obtained by i) are coated with metal compounds. Firstly, the barium titanate particles are dispersed uniformly in water. To uniformly disperse barium titanate particles, it is preferable to adjust pH and perform dispersion by dispersing machines, such as the ultrasonic homogenizer, planetary ball mill, Henschel mixer, colloid mill, wet-type jet mill, wet-type beads mill. Alkali is added to the resulting barium titanate particle slurry to mix the slurry to a homogenous state, then, an aqueous solution of metal compounds is added to induce neutralization reaction, and to deposit the metal compounds uniformly on the particle surface of the barium titanate particles. Further, when performing neutralization reaction, alkali can be added after an aqueous solution of a metal compound is added to the barium titanate particle slurry, or an aqueous solution of a metal compound and alkali may be added at the same time. Furthermore, the aqueous solution of a metal compound and alkali may be subjected to neutralization reaction before adding it to a uniformly dispersed barium titanate particle slurry to uniformly deposit the metal compound on the particles, or conversely, a uniformly dispersed barium titanate particle slurry may be added to an aqueous solution of a metal compound and alkali. In addition, when barium titanate particles are added as powder, the mixed slurry is uniformly dispersed thereafter. Also, alkali may be added as an aqueous solution, or as powder, solid and crystal.

The aqueous solution of a metal compound can be sulfate, nitrate, chloride, alkoxide, etc. of Mg, Ca, Ba, Mn, rare earth elements. The concentration of the aqueous solution should preferably be 0.001 to 10 mol/L, more preferably 0.01 to 5.0 mol/L.

The alkali to be used includes, for example, the solution, powder, solid and crystal of NaOH, KOH, $NH_3$, $Na_2CO_3$, $K_2CO_3$, $NaHCO_3$, $KHCO_3$, $(NH_4)_2CO_3$. The alkali concentration should preferably be 0.01 to 20.0 mol/L, more preferably 1.0 to 10.0 mol/L, and the amount of alkali to be added should be adjusted to make the degree of neutralization of the metal compound solution 0.8 or higher.

When depositing the metal compound, neutralization reaction may be performed at a temperature range of 100° C. or lower. A hydrothermal treatment at 100° C. or higher may be subsequently performed.

Then, the barium titanate particle slurry treated with the aqueous solution of a metal compound and alkali is filtered, washed with water, then dried, disintegrated to obtain coated barium titanate particles. The coating layer consists of hydroxides or carbonates of Mg, Ca, Ba, Mn, or rare earth elements, and it is amorphous. Also, the layer may be subjected to thermal treatment to form crystalline oxide. The highest temperature to be reached in the thermal treatment should preferably be 300 to 1500° C., more preferably 500 to 1000° C.

EXAMPLES

The coated barium titanate particles of the present invention and a production method thereof is explained by Examples, but the present invention is not limited by the Examples.

[Preparation of Barium Titanate Particles (50 nm)]

An aqueous solution containing titanium hydroxide was used as the titanium salt solution, a barium nitrate solution was used as the barium salt solution, and a sodium hydroxide solution was used as the alkali solution to prepare the raw materials to obtain a Ti amount of 0.43 mol, a Ba amount of 0.43 mol, an alkali amount of 2.58 mol [degree of neutralization=alkali amount/(4×Ti amount+2×Ba amount)=1.0]. Then, in the raw material tank, a sodium hydroxide solution was added to an aqueous solution containing titanium hydroxide under room temperature and the atmosphere, followed by addition of a barium nitrate solution, to prepare a reaction precursor, that is, an aqueous solution containing amorphous barium and titanium hydroxide. The pH value of the prepared reaction precursor was 13.2. The prepared reaction precursor was subjected to a hydrothermal reaction using a continuous hydrothermal reaction device at a temperature of 400° C., a pressure of 25 MPa, a residence time of 0.4 min, then it was filtered, washed with water, and dried to obtain 50 nm of barium titanate particles.

The obtained barium titanate particles were evaluated in terms of X-ray diffraction, mean particle size and particle size distribution. In addition, a transmission electron microscope (TEM) image (magnification of 200,000×) is shown in FIG. 1. A Rietveld Analysis by X-ray diffraction showed that the barium titanate particles are tetragonal barium titanate having a c/a ratio of 1.004, a crystallite size of 50 nm, a mean particle size of 50 nm, a Ba/Ti ratio of 1.000, a specific surface area of 31.1 $m^2/g$, and the particle size distribution measurement indicated that the median size was 50 nm, and the coefficient of variation was 20.0%. Observation by TEM showed a good uniformity in the particle form. Also, since crystallinity was high, and the mean particle size and median size matched, and the coefficient of variation was low, it can be understood that a good dispersibility was obtained.

[Preparation of Barium Titanate Particles (100 nm)]

Figure 2:
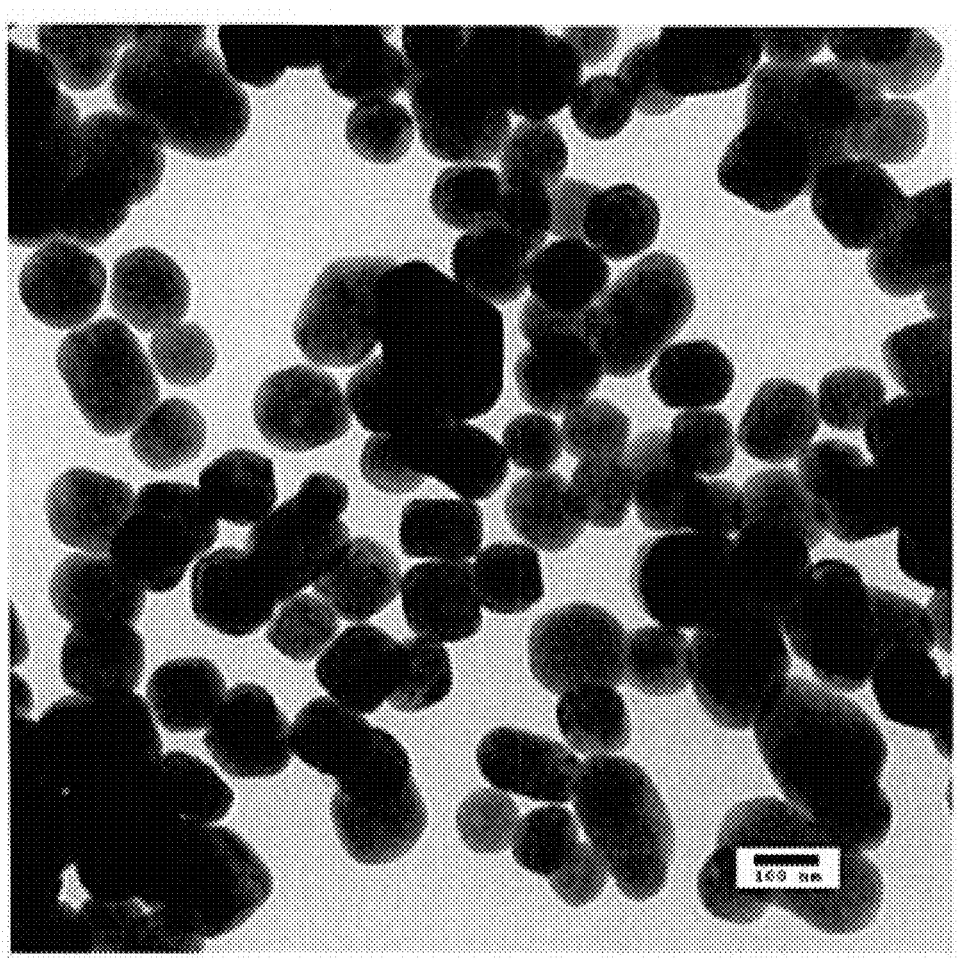
FIG. 2 is a transmission electron microscope image (magnification of 100,000×) showing the particle form of barium titanate particles of 100 nm prepared by the method of the present invention.
Figure 3:
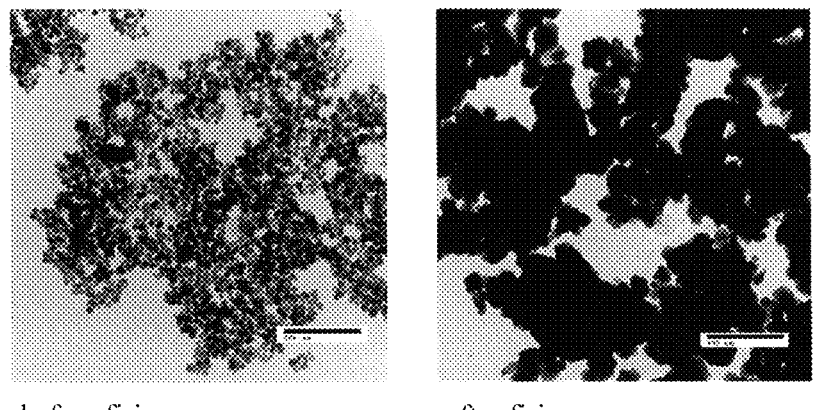
FIG. 3 is transmission electron microscope images (magnification of 60,000×) showing the particle form of Mg-coated barium titanate of 50 nm of Example 3, before and after firing.
Figure 4:
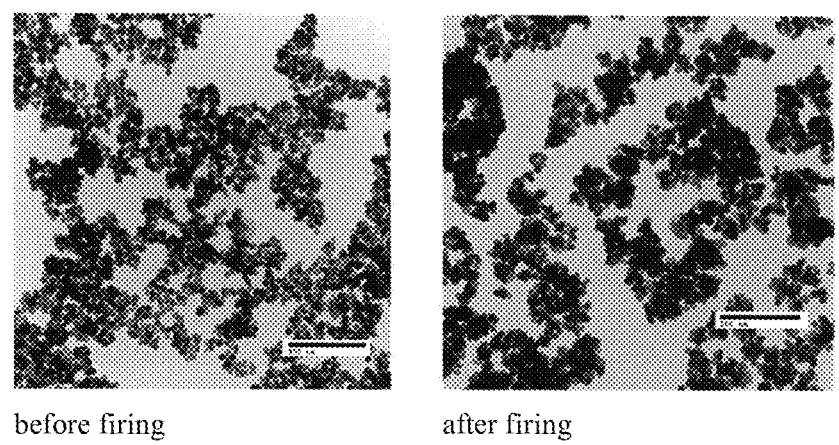
FIG. 4 is transmission electron microscope images (magnification of 60,000×) showing the particle form of Gd-coated barium titanate of 50 nm of Example 8, before and after firing.
Figure 5:
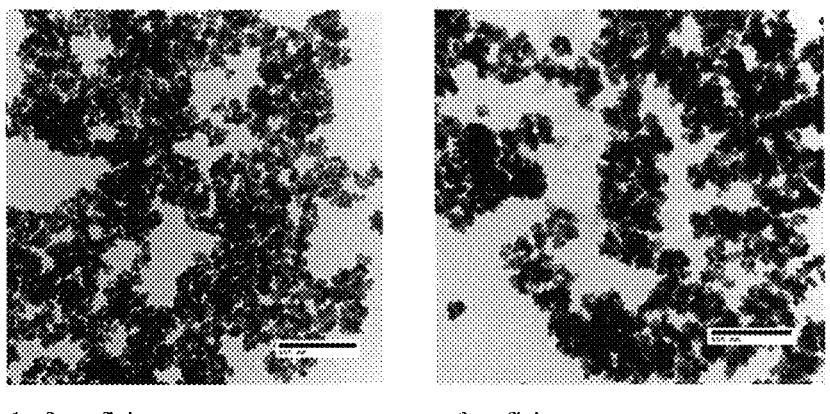
FIG. 5 is transmission electron microscope images (magnification of 60,000×) showing the particle form of Nd-coated barium titanate of 50 nm of Example 31, before and after firing.
Figure 6:
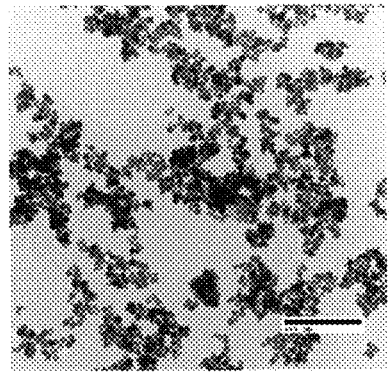
FIG. 6 is transmission electron microscope images (magnification of 60,000×) showing the particle form of La-coated barium titanate of 50 nm of Example 40, before and after firing.
Figure 6:
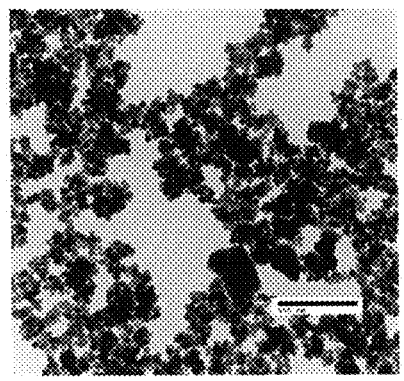
Figure 7:
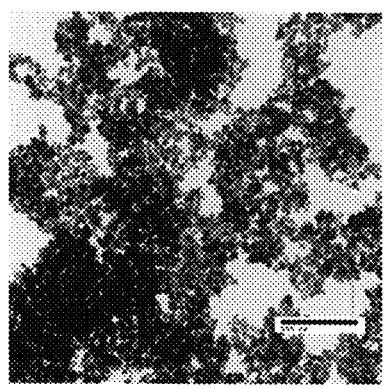
FIG. 7 is transmission electron microscope images (magnification of 60,000×) showing the particle form of barium titanate without coating of 50 nm of Comparative Example 1, before and after firing.
Figure 7:
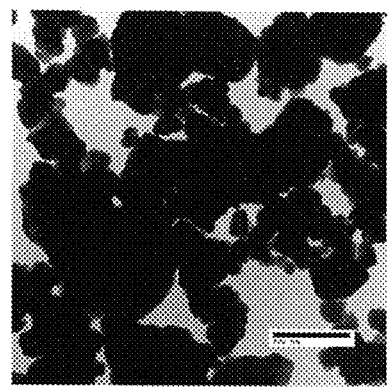

In the production method for 50 nm barium titanate particles, shown above, the alkali amount in the material preparation was changed to 5.16 mol (degree of neutralization=2.0), and the other conditions were kept the same to prepare 100 nm of barium titanate particles. The obtained barium titanate particles (100 nm) were similarly evaluated in terms of X-ray diffraction, mean particle size, and particle size distribution. The transmission electron microscope (TEM) image (magnification of 100,000×) is shown in FIG. 2.

The obtained barium titanate particles (100 nm) were tetragonal barium titanate having a c/a ratio of 1.007, a crystallite size of 100 nm, a mean particle size of 100 nm, a Ba/Ti ratio of 1.000, a specific surface area of 8.1 $m^2/g$, and the particle size distribution measurement indicated that the median size was 100 nm, and the coefficient of variation was 20.0%. Observation by TEM showed a good uniformity in the particle form. Also, since crystallinity was high, and the mean particle size and median size matched, and the coefficient of variation was low, it can be understood that a good dispersibility was obtained.

Examples 1 to 67 and Comparative Examples 1 to 5

Coating Barium Titanate Particles

First, the above 0.150 mol of barium titanate particles was added to 550 ml of pure water and a monodispersion solution was obtained using an ultrasonic homogenizer. Note that barium titanate particles of 100 nm were used in Example 63 and Comparative Example 4, a commercial product (oxalic acid salt method, particle size 500 nm) was used in Comparative Example 5, and barium titanate particles of 50 nm were used in all other examples.

After alkali was added to the monodispersion solution of barium titanate and the solution was mixed uniformly, 200 ml of a metal salt solution was added, and a neutralization reaction was performed to deposit the metal compounds on the particle surface of barium titanate particles. After deposition, the particle was filtered/washed with water, dried at 150° C., and disintegrated to obtain the target coated barium titanate particles. Concerning Examples 64 to 67, the coated barium titanate particles were thermally treated under the atmosphere (700° C., 3 hours) to convert the deposited metal compounds to their oxides. The resulting thermally treated, coated barium titanate particles were evaluated by X-ray diffraction, fluorescent X-ray analysis, and thermogravimetric analysis.

The coated barium titanate particles obtained in Examples 1 to 67, and Comparative Examples 1 to 5 without coating were subjected to firing at 1000° C. for 3 hours under a nitrogen atmosphere, 5 vol. % hydrogen atmosphere (the remaining part is nitrogen), or the atmosphere, and the grain growth regulating effect was evaluated by X-ray diffraction, fluorescent X-ray analysis, transmission electron microscope (TEM), and specific surface area measurement. The results are shown in Tables 1 to 3. Further, the TEM image (magnification of 60,000×) of Examples 3, 8, 31, 41 and Comparative Example 1 are shown in FIGS. 3 to 7. Note that the result of X-ray diffraction after firing showed the creation of BaTiO$_3$ and Ba$_2$TiO$_4$ (rhombic) in all of Examples 1 to 67 excluding Examples 14 and 15, and Comparative Examples 1 to 3. Meanwhile, Examples 14 and 15 showed the peak of BaCO$_3$ as well as BaTiO$_3$. In addition, Comparative Examples 4 and 5 showed only the peak of BaTiO$_3$.

Comparative Examples 6 to 8

Figure 8:
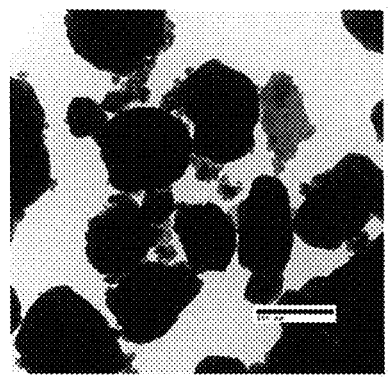
FIG. 8 is transmission electron microscope images (magnification of 60,000×) showing the particle form of a marketed product, Nd-coated barium titanate of Comparative Example 6, before and after firing.
Figure 8:
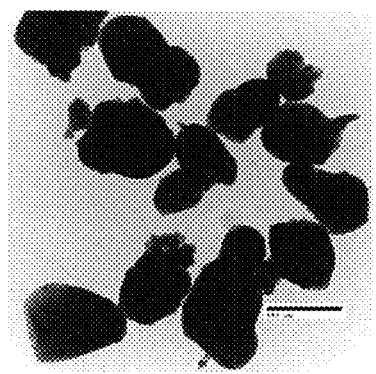

The marketed product (oxalic acid salt method, particle size 500 nm) of barium titanate particles was used to deposit Nd, Gd, La on the surface by a similar method as Examples 1 to 63, and the grain growth regulation effect was similarly evaluated. The coating condition and the result are shown in Tables 1 to 3. Further, the TEM image (magnification of 60,000×) of Comparative Example 6 is shown in FIG. 8.

Comparative Examples 9, 10

Figure 9:
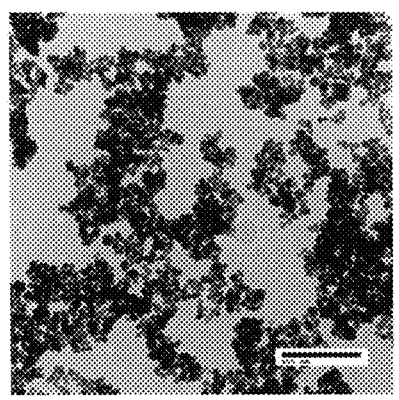
FIG. 9 is transmission electron microscope images (magnification of 60,000×) showing the particle form of Nd-coated barium titanate of 50 nm of Comparative Example 9, before and after firing.
Figure 9:
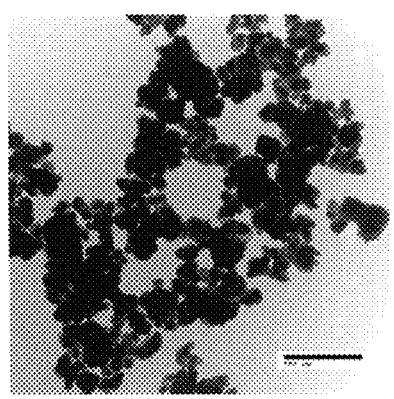

The barium titanate particles (50 nm) prepared by the method of the present invention and Nd$_2$O$_3$ powder or Ho$_2$O$_3$ powder were subjected to wet-type mixing in water using the planetary ball mill (100 rpm, 3 h) to deposit Nd or Ho. After deposition, the particles were dried at 150° C. and disintegrated to obtain the target coated barium titanate particles. The obtained, coated barium titanate particles were evaluated in terms of grain growth regulation by methods similar to Examples 1 to 67 and Comparative Examples 1 to 8. The coating condition and result are shown in Tables 1 to 3. Further, the TEM image (magnification of 60,000×) of Comparative Example 9 is shown in FIG. 9.

TABLE 1

| Example and Comp. Example | Additive | | | | | | Alkali Solution | |
|---|---|---|---|---|---|---|---|---|
| | Metal Salt | | | Added Amount (mol %) | | | | Amount |
| | Layer 1 | Layer 2 | Layer 3 | Layer 1 | Layer 2 | Layer 3 | Types | mol |
| Example 1 | Mg(NO3)2 | — | — | 10.0 | — | — | Na2CO3 | 0.015 |
| Example 2 | Mg(NO3)2 | — | — | 10.0 | — | — | Na2CO3 | 0.023 |
| Example 3 | Mg(NO3)2 | — | — | 15.0 | — | — | Na2CO3 | 0.023 |
| Example 4 | Gd(NO3)3 | — | — | 2.0 | — | — | Na2CO3 | 0.007 |
| Example 5 | Gd(NO3)3 | — | — | 5.0 | — | — | Na2CO3 | 0.017 |
| Example 6 | Gd(NO3)3 | — | — | 6.0 | — | — | Na2CO3 | 0.020 |
| Example 7 | Gd(NO3)3 | — | — | 7.5 | — | — | Na2CO3 | 0.025 |
| Example 8 | Gd(NO3)3 | — | — | 7.5 | — | — | Na2CO3 | 0.025 |
| Example 9 | Gd(NO3)3 | — | — | 10.0 | — | — | Na2CO3 | 0.034 |
| Example 10 | Gd(NO3)3 | — | — | 15.0 | — | — | Na2CO3 | 0.051 |
| Example 11 | Gd(NO3)3 | — | — | 2.0 | — | — | Na2CO3 | 0.007 |
| Example 12 | Gd(NO3)3 | — | — | 5.0 | — | — | Na2CO3 | 0.017 |
| Example 13 | Gd(NO3)3 | — | — | 7.5 | — | — | Na2CO3 | 0.025 |
| Example 14 | Gd(NO3)3 | — | — | 2.0 | — | — | Na2CO3 | 0.007 |
| Example 15 | Gd(NO3)3 | — | — | 5.0 | — | — | Na2CO3 | 0.017 |
| Example 16 | Gd(NO3)3 | — | — | 7.5 | — | — | Na2CO3 | 0.025 |
| Example 17 | Ho(NO3)3 | — | — | 2.5 | — | — | Na2CO3 | 0.008 |
| Example 18 | Ho(NO3)3 | — | — | 5.0 | — | — | Na2CO3 | 0.017 |
| Example 19 | Ho(NO3)3 | — | — | 7.5 | — | — | Na2CO3 | 0.025 |
| Example 20 | Ho(NO3)3 | — | — | 10.0 | — | — | Na2CO3 | 0.034 |
| Example 21 | Ho(NO3)3 | — | — | 15.0 | — | — | Na2CO3 | 0.051 |
| Example 22 | Ho(NO3)3 | — | — | 7.5 | — | — | Na2CO3 | 0.025 |
| Example 23 | Ho(NO3)3 | — | — | 7.5 | — | — | Na2CO3 | 0.025 |
| Example 24 | Y(NO3)3 | — | — | 7.5 | — | — | Na2CO3 | 0.025 |
| Example 25 | Y(NO3)3 | — | — | 15.0 | — | — | Na2CO3 | 0.051 |
| Example 26 | Nd(NO3)3 | — | — | 5.0 | — | — | Na2CO3 | 0.017 |
| Example 27 | Nd(NO3)3 | — | — | 7.5 | — | — | Na2CO3 | 0.025 |
| Example 28 | Nd(NO3)3 | — | — | 10.0 | — | — | Na2CO3 | 0.034 |
| Example 29 | Nd(NO3)3 | — | — | 15.0 | — | — | Na2CO3 | 0.051 |
| Example 30 | Nd(NO3)3 | — | — | 7.5 | — | — | NaOH | 0.051 |
| Example 31 | Nd(NO3)3 | — | — | 7.5 | — | — | Na2CO3 | 0.025 |
| Example 32 | Dy(NO3)3 | — | — | 5.0 | — | — | Na2CO3 | 0.017 |
| Example 33 | Dy(NO3)3 | — | — | 7.5 | — | — | Na2CO3 | 0.025 |
| Example 34 | Dy(NO3)3 | — | — | 10.0 | — | — | Na2CO3 | 0.034 |
| Example 35 | Dy(NO3)3 | — | — | 15.0 | — | — | Na2CO3 | 0.051 |
| Example 36 | La(NO3)3 | — | — | 7.5 | — | — | Na2CO3 | 0.025 |
| Example 37 | La(NO3)3 | — | — | 10.0 | — | — | Na2CO3 | 0.034 |
| Example 38 | La(NO3)3 | — | — | 15.0 | — | — | Na2CO3 | 0.051 |
| Example 39 | La(NO3)3 | — | — | 7.5 | — | — | NaOH | 0.051 |
| Example 40 | La(NO3)3 | — | — | 7.5 | — | — | Na2CO3 | 0.025 |
| Example 41 | Ce(NO3)3 | — | — | 7.5 | — | — | Na2CO3 | 0.025 |
| Example 42 | Er(NO3)3 | — | — | 7.5 | — | — | Na2CO3 | 0.025 |
| Example 43 | Eu(NO3)3 | — | — | 7.5 | — | — | Na2CO3 | 0.025 |
| Example 44 | Sm(NO3)3 | — | — | 7.5 | — | — | Na2CO3 | 0.025 |
| Example 45 | Sm(NO3)3 | — | — | 7.5 | — | — | Na2CO3 | 0.025 |
| Example 46 | Yb(NO3)3 | — | — | 7.5 | — | — | Na2CO3 | 0.025 |
| Example 47 | Ba(NO3)2 | — | — | 7.5 | — | — | Na2CO3 | 0.017 |
| Example 48 | Ba(NO3)2 | — | — | 10.0 | — | — | Na2CO3 | 0.023 |
| Example 49 | Ca(NO3)2 | — | — | 1.0 | — | — | Na2CO3 | 0.002 |
| Example 50 | Ca(NO3)2 | — | — | 7.5 | — | — | Na2CO3 | 0.017 |
| Example 51 | Mn(NO3)2 | — | — | 1.0 | — | — | Na2CO3 | 0.002 |
| Example 52 | Mn(NO3)2 | — | — | 2.5 | — | — | Na2CO3 | 0.006 |
| Example 53 | Mn(NO3)2 | — | — | 7.5 | — | — | Na2CO3 | 0.017 |
| Example 54 | Mg(NO3)2 | Gd(NO3)3 | — | 5.0 | 7.5 | — | Na2CO3 | 0.037 |

TABLE 1-continued

| Example and Comp. Example | Additive | | | | | | Alkali Solution | |
|---|---|---|---|---|---|---|---|---|
| | Metal Salt | | | Added Amount (mol %) | | | | Amount |
| | Layer 1 | Layer 2 | Layer 3 | Layer 1 | Layer 2 | Layer 3 | Types | mol |
| Example 55 | Mg(NO3)2 | Gd(NO3)3 | — | 10.0 | 7.5 | — | Na2CO3 | 0.048 |
| Example 56 | Mg(NO3)2 | Gd(NO3)3 | — | 10.0 | 7.5 | — | Na2CO3 | 0.048 |
| Example 57 | Mg(NO3)2 | Ho(NO3)3 | — | 10.0 | 7.5 | — | Na2CO3 | 0.048 |
| Example 58 | Mg(NO3)2 | Ho(NO3)3 | — | 10.0 | 7.5 | — | Na2CO3 | 0.048 |
| Example 59 | Mg(NO3)2 | Mn(NO3)3 | Nd(NO3)3 | 5.0 | 2.5 | 7.5 | Na2CO3 | 0.042 |
| Example 60 | Mg(NO3)2 | Mn(NO3)3 | Ho(NO3)3 | 5.0 | 2.5 | 7.5 | Na2CO3 | 0.042 |
| Example 61 | Mg(NO3)2 | Mn(NO3)3 | Nd(NO3)3 | 5.0 | 2.5 | 7.5 | Na2CO3 | 0.042 |
| Example 62 | Mg(NO3)2 | Mn(NO3)3 | Ho(NO3)3 | 5.0 | 2.5 | 7.5 | Na2CO3 | 0.042 |
| Example 63 | Nd(NO3)3 | — | — | 7.5 | — | — | Na2CO3 | 0.025 |
| Example 64 | Mg(NO3)2 | Nd(NO3)3 | — | 5.0 | 7.5 | — | Na2CO3 | 0.037 |
| Example 65 | Mg(NO3)2 | Mn(NO3)3 | Nd(NO3)3 | 5.0 | 2.5 | 7.5 | Na2CO3 | 0.042 |
| Example 66 | Mg(NO3)2 | Mn(NO3)3 | Ho(NO3)3 | 5.0 | 2.5 | 7.5 | Na2CO3 | 0.042 |
| Example 67 | Mg(NO3)2 | Mn(NO3)3 | Gd(NO3)3 | 5.0 | 2.5 | 7.5 | Na2CO3 | 0.042 |
| Comp. Example 1 | Without coating | | | | | | | |
| Comp. Example 2 | Without coating | | | | | | | |
| Comp. Example 3 | Without coating | | | | | | | |
| Comp. Example 4 | Without coating | | | | | | | |
| Comp. Example 5 | Without coating | | | | | | | |
| Comp. Example 6 | Nd(NO3)3 | — | — | 7.5 | — | — | Na2CO3 | 0.025 |
| Comp. Example 7 | Gd(NO3)3 | — | — | 7.5 | — | — | Na2CO3 | 0.025 |
| Comp. Example 8 | La(NO3)3 | — | — | 7.5 | — | — | Na2CO3 | 0.025 |
| Comp. Example 9 | Nd2O3 | — | — | 7.5 | — | — | — | — |
| Comp. Example 10 | Ho2O3 | — | — | 7.5 | — | — | — | — |

TABLE 2

| Example and Comp. Example | Coated Barium Titanate before Firing | | | | | | | | |
|---|---|---|---|---|---|---|---|---|---|
| | XRD Analysis | | | XRF Analysis | | | | | SSA |
| | | | | Coated Compound | | | Content (mass %) | | |
| | | | | Layer 1 | Layer 2 | Layer 3 | Layer 1 | Layer 2 | Layer 3 | m2/g |
| Example 1 | BaTiO3 | BaCO3 | BaMg(CO3)2 | MgCO3 | — | — | 1.10 | — | — | 30.1 |
| Example 2 | BaTiO3 | BaCO3 | BaMg(CO3)2 | MgCO3 | — | — | 1.20 | — | — | 30.5 |
| Example 3 | BaTiO3 | BaCO3 | BaMg(CO3)2 | MgCO3 | — | — | 1.23 | — | — | 31.0 |
| Example 4 | BaTiO3 | BaCO3 | — | Gd2(CO3)3 | — | — | 2.10 | — | — | 30.3 |
| Example 5 | BaTiO3 | BaCO3 | — | Gd2(CO3)3 | — | — | 5.48 | — | — | 28.2 |
| Example 6 | BaTiO3 | BaCO3 | — | Gd2(CO3)3 | — | — | 6.49 | — | — | 25.7 |
| Example 7 | BaTiO3 | BaCO3 | — | Gd2(CO3)3 | — | — | 8.90 | — | — | 25.6 |
| Example 8 | BaTiO3 | BaCO3 | — | Gd2(CO3)3 | — | — | 8.22 | — | — | 25.6 |
| Example 9 | BaTiO3 | BaCO3 | — | Gd2(CO3)3 | — | — | 10.72 | — | — | 26.1 |
| Example 10 | BaTiO3 | BaCO3 | — | Gd2(CO3)3 | — | — | 15.43 | — | — | 23.2 |
| Example 11 | BaTiO3 | BaCO3 | — | Gd2(CO3)3 | — | — | 2.10 | — | — | 30.3 |
| Example 12 | BaTiO3 | BaCO3 | — | Gd2(CO3)3 | — | — | 5.48 | — | — | 28.2 |
| Example 13 | BaTiO3 | BaCO3 | — | Gd2(CO3)3 | — | — | 8.22 | — | — | 25.6 |
| Example 14 | BaTiO3 | BaCO3 | — | Gd2(CO3)3 | — | — | 2.10 | — | — | 30.3 |
| Example 15 | BaTiO3 | BaCO3 | — | Gd2(CO3)3 | — | — | 5.48 | — | — | 28.2 |
| Example 16 | BaTiO3 | BaCO3 | — | Gd2(CO3)3 | — | — | 8.22 | — | — | 25.6 |
| Example 17 | BaTiO3 | BaCO3 | — | Ho2(CO3)3 | — | — | 3.26 | — | — | 29.1 |
| Example 18 | BaTiO3 | BaCO3 | — | Ho2(CO3)3 | — | — | 5.79 | — | — | 26.7 |
| Example 19 | BaTiO3 | BaCO3 | — | Ho2(CO3)3 | — | — | 7.87 | — | — | 24.9 |
| Example 20 | BaTiO3 | BaCO3 | — | Ho2(CO3)3 | — | — | 10.16 | — | — | 24.1 |
| Example 21 | BaTiO3 | BaCO3 | — | Ho2(CO3)3 | — | — | 15.28 | — | — | 27.0 |
| Example 22 | BaTiO3 | BaCO3 | — | Ho2(CO3)3 | — | — | 7.87 | — | — | 24.9 |
| Example 23 | BaTiO3 | BaCO3 | — | Ho2(CO3)3 | — | — | 7.87 | — | — | 24.9 |
| Example 24 | BaTiO3 | BaCO3 | — | Y2(CO3)3 | — | — | 5.86 | — | — | 25.7 |
| Example 25 | BaTiO3 | BaCO3 | — | Y2(CO3)3 | — | — | 12.12 | — | — | 24.1 |
| Example 26 | BaTiO3 | BaCO3 | — | Nd2(CO3)3 | — | — | 5.67 | — | — | 26.9 |
| Example 27 | BaTiO3 | BaCO3 | — | Nd2(CO3)3 | — | — | 8.47 | — | — | 25.8 |
| Example 28 | BaTiO3 | BaCO3 | — | Nd2(CO3)3 | — | — | 11.27 | — | — | 25.3 |
| Example 29 | BaTiO3 | BaCO3 | — | Nd2(CO3)3 | — | — | 15.57 | — | — | 26.4 |
| Example 30 | BaTiO3 | BaCO3 | Nd2TiO5 | Nd(OH)3 | — | — | 6.80 | — | — | 30.7 |
| Example 31 | BaTiO3 | BaCO3 | — | Nd2(CO3)3 | — | — | 8.47 | — | — | 25.8 |
| Example 32 | BaTiO3 | BaCO3 | — | Dy2(CO3)3 | — | — | 5.17 | — | — | 27.3 |
| Example 33 | BaTiO3 | BaCO3 | — | Dy2(CO3)3 | — | — | 8.27 | — | — | 25.6 |
| Example 34 | BaTiO3 | BaCO3 | — | Dy2(CO3)3 | — | — | 10.22 | — | — | 24.2 |
| Example 35 | BaTiO3 | BaCO3 | — | Dy2(CO3)3 | — | — | 14.07 | — | — | 24.5 |
| Example 36 | BaTiO3 | BaCO3 | — | La2(CO3)3 | — | — | 6.83 | — | — | 27.7 |
| Example 37 | BaTiO3 | BaCO3 | — | La2(CO3)3 | — | — | 8.73 | — | — | 27.3 |

TABLE 2-continued

Coated Barium Titanate before Firing

| Example and Comp. Example | XRD Analysis | XRF Analysis | | | | | | | SSA m2/g |
|---|---|---|---|---|---|---|---|---|---|
| | | Coated Compound | | | Content (mass %) | | | | |
| | | Layer 1 | Layer 2 | Layer 3 | Layer 1 | Layer 2 | Layer 3 | | |
| Example 38 | BaTiO3 BaCO3 — | La2(CO3)3 | — | — | 12.96 | — | — | | 26.5 |
| Example 39 | BaTiO3 BaCO3 — | La(OH)3 | — | — | 5.47 | — | — | | 31.8 |
| Example 40 | BaTiO3 BaCO3 — | La2(CO3)3 | — | — | 6.83 | — | — | | 27.7 |
| Example 41 | BaTiO3 BaCO3 — | Ce2(CO3)3 | — | — | 9.42 | — | — | | 36.4 |
| Example 42 | BaTiO3 BaCO3 — | Er2(CO3)3 | — | — | 8.23 | — | — | | 26.2 |
| Example 43 | BaTiO3 BaCO3 — | Eu2(CO3)3 | — | — | 10.07 | — | — | | 25.4 |
| Example 44 | BaTiO3 BaCO3 — | Sm2(CO3)3 | — | — | 7.82 | — | — | | 24.7 |
| Example 45 | BaTiO3 BaCO3 — | Sm2(CO3)3 | — | — | 7.82 | — | — | | 24.7 |
| Example 46 | BaTiO3 BaCO3 — | Yb2(CO3)3 | — | — | 9.66 | — | — | | 25.2 |
| Example 47 | BaTiO3 BaCO3 — | BaCO3 | — | — | 0.29 | — | — | | 31.4 |
| Example 48 | BaTiO3 BaCO3 — | BaCO3 | — | — | 0.13 | — | — | | 31.2 |
| Example 49 | BaTiO3 BaCO3 — | CaCO3 | — | — | 0.26 | — | — | | 30.4 |
| Example 50 | BaTiO3 BaCO3 — | CaCO3 | — | — | 0.46 | — | — | | 30.3 |
| Example 51 | BaTiO3 BaCO3 — | MnCO3 | — | — | 0.51 | — | — | | 30.9 |
| Example 52 | BaTiO3 BaCO3 — | MnCO3 | — | — | 1.30 | — | — | | 32.7 |
| Example 53 | BaTiO3 BaCO3 — | MnCO3 | — | — | 3.37 | — | — | | 35.7 |
| Example 54 | BaTiO3 BaCO3 — | MgCO3 | Gd2(CO3)3 | — | 0.28 | 7.97 | — | | 25.8 |
| Example 55 | BaTiO3 BaCO3 — | MgCO3 | Gd2(CO3)3 | — | 0.86 | 8.06 | — | | 25.7 |
| Example 56 | BaTiO3 BaCO3 — | MgCO3 | Gd2(CO3)3 | — | 0.86 | 8.06 | — | | 25.7 |
| Example 57 | BaTiO3 BaCO3 — | MgCO3 | Ho2(CO3)3 | — | 0.93 | 7.68 | — | | 24.5 |
| Example 58 | BaTiO3 BaCO3 — | MgCO3 | Ho2(CO3)3 | — | 0.93 | 7.68 | — | | 24.5 |
| Example 59 | BaTiO3 BaCO3 — | MgCO3 | MnCO3 | Nd2(CO3)3 | N.D. | 1.17 | 7.99 | | 27.3 |
| Example 60 | BaTiO3 BaCO3 — | MgCO3 | MnCO3 | Ho2(CO3)3 | 0.75 | 1.08 | 7.59 | | 27.3 |
| Example 61 | BaTiO3 BaCO3 — | MgCO3 | MnCO3 | Nd2(CO3)3 | N.D. | 1.17 | 7.99 | | 27.3 |
| Example 62 | BaTiO3 BaCO3 — | MgCO3 | MnCO3 | Ho2(CO3)3 | 0.75 | 1.08 | 7.59 | | 27.3 |
| Example 63 | BaTiO3 BaCO3 — | Nd2(CO3)3 | — | — | 8.61 | — | — | | 7.9 |
| Example 64 | BaTiO3 BaCO3 — | MgO | Nd2O3 | — | N.D. | 6.43 | — | | 23.3 |
| Example 65 | BaTiO3 BaCO3 — | MgO | MnO | Nd2O3 | N.D. | 0.73 | 5.91 | | 24.2 |
| Example 66 | BaTiO3 BaCO3 — | MgO | MnO | Ho2O3 | 0.42 | 0.75 | 6.02 | | 24.3 |
| Example 67 | BaTiO3 BaCO3 — | MgO | MnO | Gd2O3 | 0.42 | 0.71 | 6.04 | | 24.0 |
| Comp. Example 1 | BaTiO3 BaCO3 — | — | — | — | — | — | — | | 31.1 |
| Comp. Example 2 | BaTiO3 BaCO3 — | — | — | — | — | — | — | | 31.1 |
| Comp. Example 3 | BaTiO3 BaCO3 — | — | — | — | — | — | — | | 31.1 |
| Comp. Example 4 | BaTiO3 BaCO3 — | — | — | — | — | — | — | | 8.1 |
| Comp. Example 5 | BaTiO3 BaCO3 — | — | — | — | — | — | — | | 3.0 |
| Comp. Example 6 | BaTiO3 BaCO3 — | Nd2(CO3)3 | — | — | 8.27 | — | — | | 4.3 |
| Comp. Example 7 | BaTiO3 BaCO3 — | Gd2(CO3)3 | — | — | 8.73 | — | — | | 7.4 |
| Comp. Example 8 | BaTiO3 BaCO3 — | La2(CO3)3 | — | — | 6.04 | — | — | | 3.8 |
| Comp. Example 9 | BaTiO3 BaCO3 BaNd2O4 | Nd2O3 | — | — | 6.12 | — | — | | 30.5 |
| Comp. Example 10 | BaTiO3 BaCO3 Ho2O3 | Ho2O3 | — | — | 5.45 | — | — | | 29.2 |

TABLE 3

Coated Barium Titanate after Firing

| Example and Comp. Example | Firing Atmosphere | XRF Analysis | | | | | | SSA m2/g |
|---|---|---|---|---|---|---|---|---|
| | | Coated Compound | | | Content (mass %) | | | |
| | | Layer 1 | Layer 2 | Layer 3 | Layer 1 | Layer 2 | Layer 3 | |
| Example 1 | Nitrogen | MgO | — | — | 0.53 | — | — | 4.6 |
| Example 2 | Nitrogen | MgO | — | — | 0.73 | — | — | 4.0 |
| Example 3 | Nitrogen | MgO | — | — | 0.64 | — | — | 4.7 |
| Example 4 | Nitrogen | Gd2O3 | — | — | 1.52 | — | — | 4.3 |
| Example 5 | Nitrogen | Gd2O3 | — | — | 4.03 | — | — | 10.9 |
| Example 6 | Nitrogen | Gd2O3 | — | — | 5.06 | — | — | 15.3 |
| Example 7 | Nitrogen | Gd2O3 | — | — | 6.51 | — | — | 15.9 |
| Example 8 | Nitrogen | Gd2O3 | — | — | 6.01 | — | — | 16.8 |

TABLE 3-continued

| | | Coated Barium Titanate after Firing | | | | | | |
| | | XRF Analysis | | | | | | |
| Example and Comp. Example | Firing Atmosphere | Coated Compound | | | Content (mass %) | | | SSA m2/g |
| | | Layer 1 | Layer 2 | Layer 3 | Layer 1 | Layer 2 | Layer 3 | |
|---|---|---|---|---|---|---|---|---|
| Example 9 | Nitrogen | Gd2O3 | — | — | 8.19 | — | — | 13.5 |
| Example 10 | Nitrogen | Gd2O3 | — | — | 11.84 | — | — | 9.6 |
| Example 11 | 5 vol. % $H_2$ | Gd2O3 | — | — | 1.57 | — | — | 5.2 |
| Example 12 | 5 vol. % $H_2$ | Gd2O3 | — | — | 3.82 | — | — | 9.2 |
| Example 13 | 5 vol. % $H_2$ | Gd2O3 | — | — | 5.9 | — | — | 10.6 |
| Example 14 | atmosphere | Gd2O3 | — | — | 1.58 | — | — | 6.5 |
| Example 15 | atmosphere | Gd2O3 | — | — | 3.86 | — | — | 9.2 |
| Example 16 | atmosphere | Gd2O3 | — | — | 6.15 | — | — | 11.6 |
| Example 17 | Nitrogen | Ho2O3 | — | — | 2.57 | — | — | 3.6 |
| Example 18 | Nitrogen | Ho2O3 | — | — | 4.38 | — | — | 4.5 |
| Example 19 | Nitrogen | Ho2O3 | — | — | 6.07 | — | — | 6.0 |
| Example 20 | Nitrogen | Ho2O3 | — | — | 7.74 | — | — | 6.6 |
| Example 21 | Nitrogen | Ho2O3 | — | — | 11.93 | — | — | 7.9 |
| Example 22 | 5 vol. % $H_2$ | Ho2O3 | — | — | 5.98 | — | — | 6.8 |
| Example 23 | atmosphere | Ho2O3 | — | — | 6.08 | — | — | 7.0 |
| Example 24 | Nitrogen | Y2O3 | — | — | 4.28 | — | — | 6.0 |
| Example 25 | Nitrogen | Y2O3 | — | — | 8.03 | — | — | 8.4 |
| Example 26 | Nitrogen | Nd2O3 | — | — | 4.18 | — | — | 14.8 |
| Example 27 | Nitrogen | Nd2O3 | — | — | 6 | — | — | 16.5 |
| Example 28 | Nitrogen | Nd2O3 | — | — | 8.37 | — | — | 16.0 |
| Example 29 | Nitrogen | Nd2O3 | — | — | 11.7 | — | — | 15.4 |
| Example 30 | Nitrogen | Nd2O3 | — | — | 5.84 | — | — | 16.5 |
| Example 31 | 5 vol. % $H_2$ | Nd2O3 | — | — | 6.29 | — | — | 15.8 |
| Example 32 | Nitrogen | Dy2O3 | — | — | 3.91 | — | — | 5.2 |
| Example 33 | Nitrogen | Dy2O3 | — | — | 6.09 | — | — | 6.4 |
| Example 34 | Nitrogen | Dy2O3 | — | — | 7.89 | — | — | 6.3 |
| Example 35 | Nitrogen | Dy2O3 | — | — | 10.99 | — | — | 7.7 |
| Example 36 | Nitrogen | La2O3 | — | — | 4.97 | — | — | 15.5 |
| Example 37 | Nitrogen | La2O3 | — | — | 6.28 | — | — | 16.6 |
| Example 38 | Nitrogen | La2O3 | — | — | 9.33 | — | — | 14.3 |
| Example 39 | Nitrogen | La2O3 | — | — | 4.99 | — | — | 17.8 |
| Example 40 | 5 vol. % $H_2$ | La2O3 | — | — | 4.79 | — | — | 16.1 |
| Example 41 | Nitrogen | CeO2 | — | — | 7.53 | — | — | 10.2 |
| Example 42 | Nitrogen | Er2O3 | — | — | 6.34 | — | — | 5.3 |
| Example 43 | Nitrogen | Eu2O3 | — | — | 7.57 | — | — | 15.2 |
| Example 44 | Nitrogen | Sm2O3 | — | — | 5.92 | — | — | 16.0 |
| Example 45 | 5 vol. % $H_2$ | Sm2O3 | — | — | 5.87 | — | — | 12.5 |
| Example 46 | Nitrogen | Yb2O3 | — | — | 8.42 | — | — | 4.4 |
| Example 47 | Nitrogen | BaO | — | — | N.D. | — | — | 4.4 |
| Example 48 | Nitrogen | BaO | — | — | 0.41 | — | — | 3.8 |
| Example 49 | Nitrogen | CaO | — | — | 0.15 | — | — | 4.6 |
| Example 50 | Nitrogen | CaO | — | — | 0.24 | — | — | 4.6 |
| Example 51 | Nitrogen | MnO | — | — | 0.31 | — | — | 4.7 |
| Example 52 | Nitrogen | MnO | — | — | 0.79 | — | — | 5.0 |
| Example 53 | Nitrogen | MnO | — | — | 2.03 | — | — | 3.4 |
| Example 54 | Nitrogen | MgO | Gd2O3 | — | 0.16 | 6.14 | — | 13.8 |
| Example 55 | Nitrogen | MgO | Gd2O3 | — | 0.41 | 6.09 | — | 9.0 |
| Example 56 | 5 vol. % $H_2$ | MgO | Gd2O3 | — | 0.41 | 5.96 | — | 9.6 |
| Example 57 | Nitrogen | MgO | Ho2O3 | — | 0.4 | 5.97 | — | 5.7 |
| Example 58 | 5 vol. % $H_2$ | MgO | Ho2O3 | — | 0.42 | 6.06 | — | 6.8 |
| Example 59 | Nitrogen | MgO | MnO | Nd2O3 | N.D. | 0.73 | 6.22 | 6.3 |
| Example 60 | Nitrogen | MgO | MnO | Ho2O3 | 0.31 | 0.74 | 6.06 | 4.5 |
| Example 61 | 5 vol. % $H_2$ | MgO | MnO | Nd2O3 | N.D. | 0.73 | 6.02 | 9.4 |
| Example 62 | 5 vol. % $H_2$ | MgO | MnO | Ho2O3 | 0.29 | 0.61 | 5.17 | 5.9 |
| Example 63 | Nitrogen | Nd2O3 | — | — | 6.41 | — | — | 5.1 |
| Example 64 | 5 vol. % $H_2$ | MgO | Nd2O3 | — | N.D. | 6.28 | — | 12.1 |
| Example 65 | 5 vol. % $H_2$ | MgO | MnO | Nd2O3 | N.D. | 0.73 | 6.10 | 10.7 |
| Example 66 | 5 vol. % $H_2$ | MgO | MnO | Ho2O3 | 0.30 | 0.71 | 5.86 | 6.2 |
| Example 67 | 5 vol. % $H_2$ | MgO | MnO | Gd2O3 | 0.41 | 0.69 | 5.78 | 8.3 |
| Comp. Example 1 | Nitrogen | — | — | — | — | — | — | 2.8 |
| Comp. Example 2 | 5 vol. % $H_2$ | — | — | — | — | — | — | 2.7 |
| Comp. Example 3 | atmosphere | — | — | — | — | — | — | 1.8 |
| Comp. Example 4 | Nitrogen | — | — | — | — | — | — | 3.3 |
| Comp. Example 5 | Nitrogen | — | — | — | — | — | — | 1.5 |
| Comp. Example 6 | Nitrogen | Nd2O3 | — | — | 6.06 | — | — | 1.8 |
| Comp. Example 7 | Nitrogen | Gd2O3 | — | — | 6.44 | — | — | 1.8 |
| Comp. Example 8 | Nitrogen | La2O3 | — | — | 4.61 | — | — | 2.7 |
| Comp. Example 9 | Nitrogen | Nd2O3 | — | — | 6.06 | — | — | 8.2 |
| Comp. Example 10 | Nitrogen | Ho2O3 | — | — | 5.84 | — | — | 4.6 |

When Examples 1 to 60 and Comparative Example 1 are compared, the specific surface area after firing under a nitrogen atmosphere in Comparative Example 1 is 2.8 m$^2$/g, but the specific surface are after firing under a nitrogen atmosphere in the method of the present invention, in which the barium titanate particle of a particle size of 50 nm is coated, is larger than 2.8 m$^2$/g, clearly indicating that the grain growth regulating effect is enhanced largely by the coating layer of the present invention.

When Example 36 and Example 39 are compared, the specific surface areas are respectively 15.5 m$^2$/g and 17.8 m$^2$/g for coating layers of carbonate and hydroxide, indicating that a use of a hydroxide provided a grain growth regulating effect similar to that of a carbonate.

When the TEM image (FIG. 3) of Example 3, a TEM image (FIG. 4) of Example 8 and the TEM image (FIG. 7) of Comparative Example 1 were compared, a grain growth regulating effect was confirmed for particles coated by the method of the present invention from the TEM image after firing.

When Example 19 and Comparative Example 10, or Example 27 and Comparative Example 9 were compared, the specific surface area after firing under a nitrogen atmosphere was largely enhanced by coating the particles using the method of the present invention compared to coating by the conventional wet-type mixing, clearly indicating a high grain growth regulating effect.

The TEM image (FIG. 9) before firing in Comparative Example 9 revealed that the coating layer is uniformly formed by the conventional coating process using a wet-type synthesis, but the grain growth regulating effect was low.

When Example 63 and Comparative Example 4 are compared, the barium titanate particles of a particle size of 100 nm coated by the present method largely improved the specific surface area after firing under nitrogen atmosphere from 3.3 m$^2$/g to 5.1 m$^2$/g compared to particles whose surface were not coated, clearly indicating the grain growth regulating effect by the coating layer of the present invention.

When Examples 11 to 67 and Comparative Example 2 are compared, the specific surface area after firing in a 5 vol. % hydrogen atmosphere in Comparative Example 2 is 2.7 m$^2$/g, whereas the specific surface area after firing under a 5 vol. % hydrogen atmosphere is larger than 2.7 m$^2$/g when the barium titanate particles of a particle size of 50 nm are coated by the method of the present invention, clearly indicating that the grain growth regulating effect is largely enhanced by the coating layer of the present invention.

When Examples 61, 62, 65 and 66 are compared, the specific surface areas are respectively 9.4 m$^2$/g, 10.7 m$^2$/g, 5.9 m$^2$/g, 6.2 m$^2$/g, and a similar grain growth regulating effect was seen for a coating layer of carbonate as well as oxide.

From the TEM image (FIG. 5) of Example 31 and the TEM image (FIG. 6) of Example 40, it can be seen that the grain growth after firing is regulated.

When Examples 14 to 23 and Comparative Example 3 are compared, the specific surface area after firing under the atmosphere in Comparative Example 3 is 1.8 m$^2$/g, whereas the specific surface area after firing under the atmosphere is larger than 1.8 m$^2$/g when the barium titanate particles of a particle size of 50 nm are coated by the method of the present invention, clearly indicating that the grain growth regulating effect is largely enhanced by the coating layer of the present invention.

From Comparative Example 5 and Comparative Examples 6 to 8, it can be seen that the grain growth regulating effect for particles coated with the method of the present invention does not differ largely from those that are not coated when barium titanate of a marketed product is used.

From the TEM image (FIG. 8) before firing of Comparative Example 6, it can be seen that when barium titanate of a marketed product is coated with the method of the present invention, the coating layer is not uniformly formed.

From the results of Examples 1 to 67, a grain growth regulating effect in firing under respective atmospheres was observed in the coated barium titanate particles of the present invention compared to the barium titanate particles of Comparative Examples 1 to 5 without coating.

From the comparison of Examples 4, 5, 8, 11 to 16, a high regulating effect was seen in the order of nitrogen atmosphere, a 5 vol. % hydrogen atmosphere (the remainder is nitrogen), and the atmosphere, under the effect of the firing atmosphere. In addition, the regulating effect was at the same level when the metal compound was hydroxide, carbonate or oxide.

Coating was performed similarly in Comparative Examples 6 to 8 using barium titanate particles of 500 nm of a marketed product, but the particle surface could not be uniformly coated, and particulates of rare earth compounds were generated. Hence, the grain growth regulating effect was lower than the coated barium titanate particles of the present invention.

In Comparative Examples 9, 10, the rare earth oxide powder was dispersed uniformly in barium titanate particles by wet-type mixing similarly to the conventional MLCC production process, but the particle surface could not be coated uniformly compared to the coated barium titanate particles of the present invention, and the grain growth regulating effect was low.

<Evaluation Method>

(1) X-Ray Diffraction (XRD)

The X-ray diffraction device of Bruker AXS (D8 ADVANCE/V) was used for measurement to perform a qualitative analysis, or a quantitative analysis by the Rietveld Analysis (tetragonal BaTiO$_3$, cubic BaTiO$_3$, BaCO$_3$, etc.), and to obtain a lattice constant (c/a ratio of tetragonal barium titanate) and a crystallite size.

(2) Barium/Titanium Ratio

The fluorescent X-ray analysis device of Bruker AXS (S8 Tiger) was used for measurement. The Ba/Ti ratio was obtained according to the Glass-Beads method under the standard of Electronic Materials Manufacturers Association of Japan, EMAS-4202.

(3) Specific Surface Area (SSA)

Full-automatic BET specific surface area measurement device by Mountech Co., ltd. (Macsorb HM Model-1210) was used for measurement.

(4) Measurement of Mean Particle Size, Evaluation of Particle Shape and Uniformity A transmission electron microscope (TEM) by Hitachi High-Technologies Corporation was used to measure more than 200 particles, and the average was obtained. The particle shape was evaluated by observation of the TEM image, and uniformity was evaluated by relative standard deviation of the measured value of the mean particle size.

(5) Particle Size Distribution

Particles (5 to 10 mg) were added to 30 ml of a 0.2 mass % sodium hexametaphosphate solution and dispersed using an ultrasonic homogenizer (600 W, 30 seconds). The dispersion was measured using a dynamic light scattering particle size distribution measurement device by HORIBA, Ltd. (LB-550), and the median size and the coefficient of variation were obtained.

(6) Fluorescent X-Ray Analysis (XRF)

The X-ray diffraction device of Bruker AXS (S8 Tiger) was used for element analysis. Hydrogen, carbon, oxygen in the compound were obtained by theoretical calculation from the metal content. Further, the Ba coating was obtained from the difference with the barium titanate particles without coating. The coated barium titanate was obtained by metal compound types, and by metal oxides after firing.

(7) Thermogravimetric Analysis

Differential thermogravimetric analyzer (TG-DTA) by Rigaku Corporation (TG-8210) was used to measure the temperature range from room temperature to 1200° C. When the metal compound is amorphous, the metal compound type was confirmed from the difference with the reduction in the thermogravity amount and the fluorescent X-ray analysis value of before and after firing of barium titanate particles without coating.

The invention claimed is:

1. A method for producing a coated barium titanate particle comprising a coating layer comprising a carbonate of at least one type of metal selected from a group consisting of Mg, Ca, Ba, Mn and rare earth elements on a surface of a barium titanate particle, wherein the barium titanate particle without the coating has a mean particle size of 10 nm or higher and lower than 1000 nm, a Ba/Ti ratio of 0.80 or higher and 1.20 or lower, and a c/a ratio, which is a rate of a c-axis and an a-axis, of 1.001 or higher and 1.010 or lower comprising the steps of:
   (1) mixing an aqueous solution containing barium hydroxide and an aqueous solution containing titanium hydroxide at a Ba/Ti ratio of barium and titanium of 0.80 or higher and 1.20 or lower, and subjecting a resulting mixture to a hydrothermal reaction at a temperature of 200° C. or higher and 450° C. or lower, a pressure of 10 MPa or higher and 40 MPa or lower, and a reaction time of 0.1 minute or longer and 1 hour or shorter to obtain barium titanate particles;
   (2) homogenously dispersing the barium titanate particle obtained in (1) in an aqueous solution; and
   (3) adding a metal compound solution and alkali to a dispersion solution of barium titanate particles obtained in (2) to deposit a carbonate of metal on surfaces of the barium titanate particles.

2. A method for producing the coated barium titanate particle according to claim 1, wherein the rare earth elements are at least one element selected from a group consisting of Sc, Y, La, Ce, Pr, Nd, Pm, Sm, Eu, Gd, Tb, Dy, Ho, Er, Tm, Yb, and Lu.

3. A method for producing the coated barium titanate particle according to claim 1, wherein an amount of the coating layer on a basis of a total mass of the coated barium titanate particle and the coating layer is 0.01 mass % or higher and 20.0 mass % or lower.

* * * * *